No. 827,739. PATENTED AUG. 7, 1906.
C. E. LINGENFELTER.
PIPE OR HOSE COUPLING.
APPLICATION FILED JUNE 12, 1905.
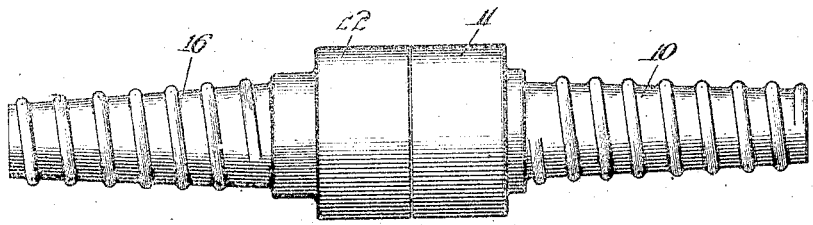
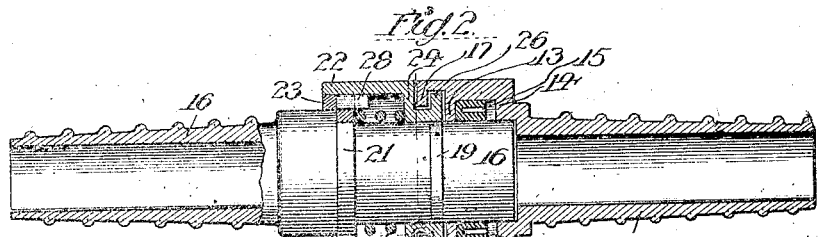
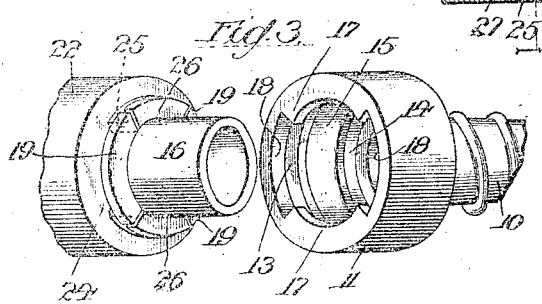
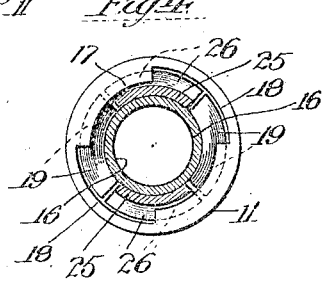
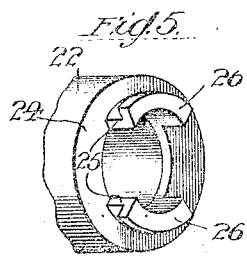
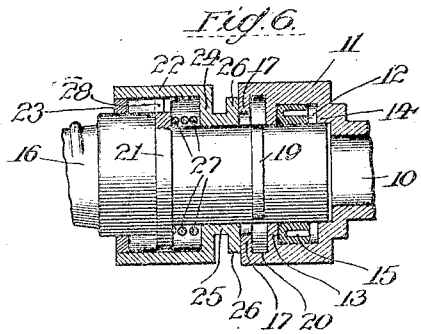
Witnesses:
Inventor:
Carl E. Lingenfelter
by Peirce & Fisher
Attorneys

UNITED STATES PATENT OFFICE.

CARL E. LINGENFELTER, OF CHICAGO, ILLINOIS, ASSIGNOR TO SCULLY STEEL & IRON COMPANY, OF CHICAGO, ILLINOIS, A CORPORATION.

PIPE OR HOSE COUPLING.

No. 827,739.    Specification of Letters Patent.    Patented Aug. 7, 1906.

Application filed June 12, 1905. Serial No. 264,793.

*To all whom it may concern:*

Be it known that I, CARL E. LINGENFELTER, a citizen of the United States, and a resident of Chicago, county of Cook, and State of Illinois, have invented certain new and useful Improvements in Pipe or Hose Couplings, of which the following is declared to be a full, clear, and exact description.

The invention relates to couplings for pipes or hose, and seeks to provide a simple and efficient device by which the sections of pipe or hose may be readily coupled and uncoupled and in which the members of the coupling are automatically locked when in connected position, but in which the locking portions are so arranged that a swivel connection is formed between the coupling members.

The invention consists in the features of construction and arrangements of parts hereinafter set forth, illustrated in the accompanying drawings, and more particularly pointed out in the appended claims.

In the drawings, Figure 1 is a side elevation of the improved coupling. Fig. 2 is a longitudinal section thereof with a portion of the male member of the coupling shown in elevation. Fig. 3 is a perspective view of the ends of the coupling members. Fig. 4 is a cross-section of the connected members, taken on line 4 4 of Fig. 2. Fig. 5 is a perspective end view of the locking-ring. Fig. 6 is a view similar to that shown in Fig. 2, but in which the connection between the coupling members is not complete.

Male and female coupling members are preferably employed. The female member 10 is provided with an enlarged head 11, having an internal annular groove 12 arranged between an inwardly-projecting flange or abutment 13 and the shoulder 14. The packing-ring 15, preferably U-shaped in section, is arranged in the groove 12, and the end of the male member 16 extends within the female member and projects through the packing-ring, so that the latter engages the outer surface thereof.

One of the coupling members is provided with an inwardly-projecting notched flange, and the other coupling member is provided with outwardly or radially projecting lugs arranged to engage such notched flange. Preferably the inwardly-projecting flange, having sector-shaped portions or lugs 17 and notches 18, is arranged upon the end of the head 11 of the female coupling member 10, while the male section is provided with outwardly-projecting sector-shaped lugs 19, arranged to interlock with the notched flange of the female member. The inwardly-projecting flange 17 of the female member is separated somewhat from the flange or abutment 13 thereof, so as to leave a space 20 to receive the lugs 19 of the male member.

One of the coupling members is provided with an axially-movable locking-ring having radially-disposed lugs arranged to engage the flanges or lugs of the other of said members. This axially-movable locking-ring is preferably mounted upon the male member, and for this purpose the latter is provided at some distance from its end with an annular flange 21, over which the locking-ring 22 slides. A ring 23, soldered, brazed, or otherwise secured within the inner end of the locking-ring 22, forms an abutment or shoulder and engages the flange 21 of the male member to prevent the withdrawal of the locking-ring therefrom. The outer end of the locking-ring is provided with an inwardly-projecting flange or abutment 24, from the inner edge of which extend the forwardly-projecting portions 25, having outwardly or radially extending segmental lugs 26 at their ends. A spring 27, coiled about the male member, is interposed between the flange 21 thereof and the flange 24 of the locking-ring. Spring 27 normally holds the locking-ring in its forward position with the abutment 23 thereof in engagement with the flange 21 and with the lugs 26 of the locking-ring in line with the lugs 19 of the male member.

In connecting the coupling members the lugs 19 of the male member are first passed through the notches 18 of the female member. As this is done the engagement of the portions or lugs 17 of the notched flange with the lugs 26 of the locking-ring will force the latter back against the pressure of spring 27 into the position shown in Fig. 6, so that the male member may be turned to bring its lugs 19 behind the lugs 17 of the female member. As soon, however, as the lugs 26 of the locking-ring register with the notches 18 the spring 27 will force the locking-ring forward to bring its lugs 26 again in line with the lugs 19 of the male member. It should be noted that the lugs 19 and 26 of the male member and locking-ring and the notched flange 17 of the female member are arranged in a plane at right angles to the axles of the coupling and that in connected position the lugs 19 and 26 are arranged in line behind the notched flange and within the annular space 20 of the female coupling, so that a swiveled connection is formed between the members. At the same time, however, the coupling members are automatically locked against disengagement, since in any position either the lugs 19 or 26 are behind the inwardly-projecting portions 17 of the female member. It should also be noted that the lugs 19 of the male member and the lugs 26 of the locking-ring are alternately disposed and are arranged to be brought successively into engagement with the notched flange of the female member. To disengage the coupling, the members are turned until the lugs 26 of the locking-ring are opposite the openings 18 of the notched flange. The locking-ring can then be withdrawn against the tension of its spring 27 into the position shown in Fig. 6. Then by further giving a quarter-turn to the male member the lugs 19 are brought opposite the openings 18 and the male member can be withdrawn from its connected position. A key 28 on the locking-ring engages a notch in flange 21 and prevents the rotation of the locking-ring on the male member 16.

It is obvious that the details of structure may be varied without departure from the essentials of the invention.

Having described my invention, what I claim as new, and desire to secure by Letters Patent, is—

1. A pipe-coupling comprising two members, one having an inwardly-projecting notched flange and the other having outwardly-projecting interlocking lugs, and an axially-movable locking-ring mounted on one of said members and having radially-disposed lugs arranged to engage the flanges or lugs of the other of said members.

2. A pipe-coupling comprising two members having interlocking flanges or lugs and an axially-movable locking-ring mounted on one of said members and having lugs arranged to engage the flanges or lugs of the other of said members, said flanges and lugs being arranged in planes at right angles to the axis of the coupling and adapted to slide past each other, whereby a swiveled connection is formed between said coupling members.

3. A pipe-coupling comprising two members having radially-disposed interlocking flanges or lugs, and a spring-held, axially-movable locking-ring mounted on one of said members and having radially-disposed lugs arranged to engage the flanges or lugs of the other of said members.

4. A pipe-coupling comprising two members, one having an inwardly-projecting notched flange and the second member having outwardly-projecting interlocking lugs and an axially-movable locking-ring mounted on said second member and having outwardly-projecting lugs arranged to engage said notched flange.

5. A pipe-coupling comprising two members, one of said members having an inwardly-projecting notched flange, and an axially-movable, spring-held locking-ring on the other of said members, said locking-ring and said second coupling member having alternately arranged, outwardly-projecting lugs arranged to be brought successively into engagement with said notched flange.

6. A pipe-coupling comprising male and female members, one of said members having an inwardly-projecting notched flange and the other having outwardly-projecting interlocking lugs, an axially-movable locking-ring mounted on one of said members having radially-disposed lugs arranged to engage the flanges or lugs of the other of said members, said lugs and flange being arranged to slide by one another in connected position, whereby a swiveled connection is formed between said coupling members, and a packing-ring on said female member through which said male member extends.

7. A pipe-coupling comprising male and female members, said female member having an inwardly-projecting notched flange, and said male member having outwardly-projecting interlocking lugs, and an axially-movable locking-ring on said male member having outwardly-projecting lugs, the outwardly-projecting lugs of both said male member and said locking-ring being arranged to engage the inwardly-projecting notched flange of said female member, substantially as described.

8. A pipe-coupling comprising male and female members, said female member having an inwardly-projecting notched flange, an axially-movable spring-held locking-ring mounted on said male member, said male member and said locking-ring having alternately-disposed, outwardly-projecting lugs arranged to be brought successively into engagement with the notched flange of said female member and a packing-ring in said female member through which said male member extends.

CARL E. LINGENFELTER.

Witnesses:
KATHARINE GERLACH,
HARRY L. CLAPP.